Aug. 3, 1965  J. W. PAYNE  3,198,729
CONTINUOUS CONVERSION OF HYDROCARBONS WITH SENSITIVE CATALYST
Filed Jan. 2, 1962  2 Sheets-Sheet 1

INVENTOR.
John W. Payne
BY
Charles A. Huggett
Attorney

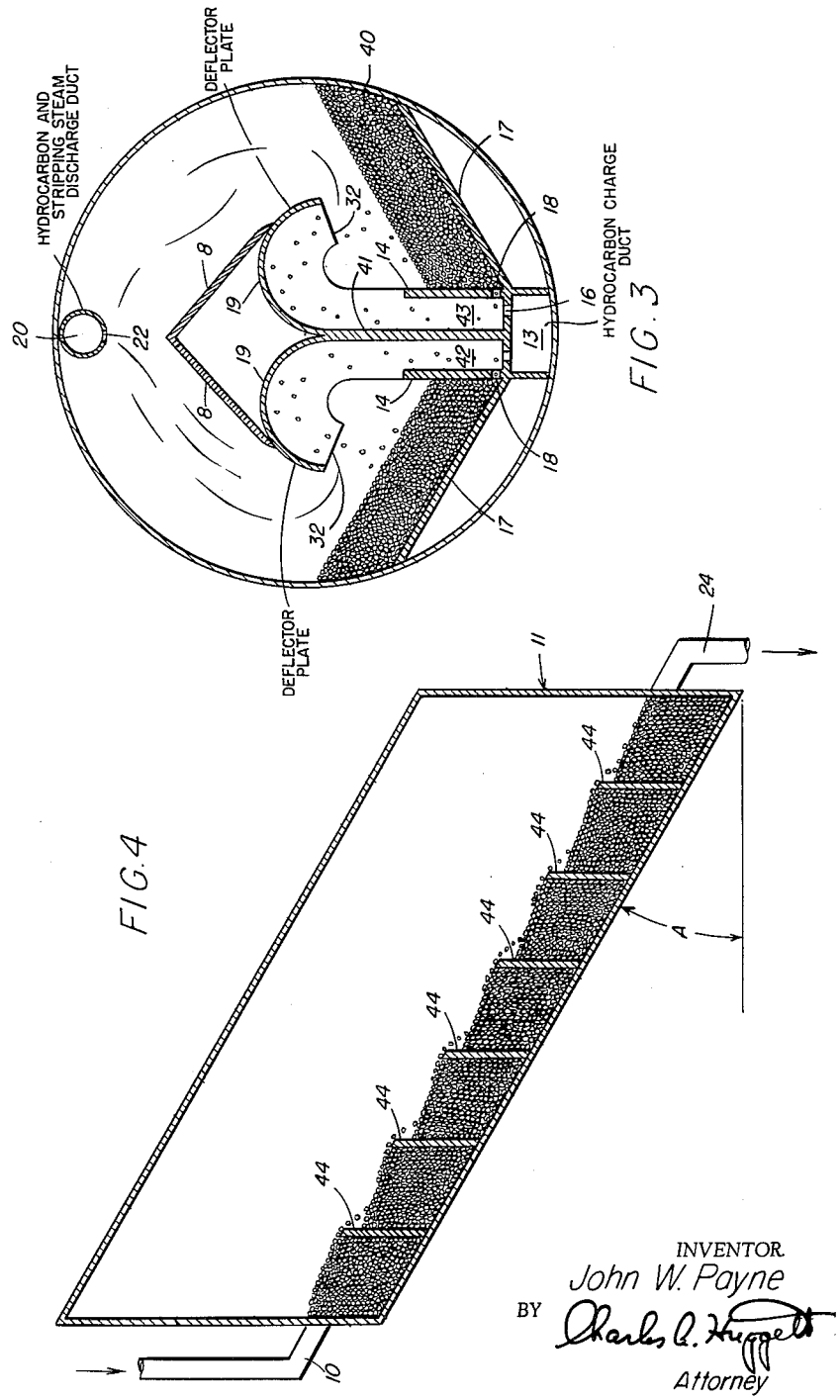

3,198,729
CONTINUOUS CONVERSION OF HYDROCARBONS
WITH SENSITIVE CATALYST
John W. Payne, Woodbury, N.J., assignor to Socony
Mobil Oil Company, Inc., a corporation of New York
Filed Jan. 2, 1962, Ser. No. 163,437
10 Claims. (Cl. 208—168)

This invention relates to the conduct of chemical reactions by bringing a vapor or gas into contact with highly reactive catalyst particles on a continuous basis. The invention is more particularly concerned with the continuous conversion of hydrocarbons in the presence of suspended fine catalyst particles of high catalytic activity for the particular conversion reaction.

This invention may be applied to such processes as catalytic cracking, isomerization, alkylation and other contacting processes. The invention can be applied broadly to any process in which a highly active catalyst is used in particulate form to effect a reaction and in which the contact time of the catalyst with the reactant fluid is quite short and critical. The invention finds ready application in the cracking of heavy hydrocarbons to produce lighter materials, such as in the conversion of gas oils or heavier oils into gasoline or light gases.

Catalytic conversion of hydrocarbons has been extensively used commercially in the past. The moving bed system in which the catalyst is lowered through the reaction vessel as a compact gravitating mass while the reactant fluids are forced through the void spaces in the bed has found much favor. The fluid system has also been used in which the catalyst is conveyed as floating discrete particles in a stream of gas and in which the particles are maintained in boiling motion in the reaction vessel by upward gas flow. One of the defects of this system involves the retention of some particles in the reactor for an excessive period of time due to churning of catalyst in the reaction zone. This churning occurs so that the amount of time each particle is retained in the reaction vessels or in the transfer pipes varies from a maximum to a minimum value and hence only average values are considered.

The fresh catalyst added in the moving bed cracking processes has a cracking activity of about 40–45, whereas the catalyst in the system has an average activity of about 25–30. The activity of cracking catalysts is generally evaluated in a standard laboratory test apparatus and is given a number which indicates the ability of the catalyst to convert the charge to motor fuel, the number being designated the activity index of the catalyst. The catalyst activity test generally used involves the passage of a standard charge such as a light East Texas gas oil over a 200 ml. fixed bed of catalyst at 800° F. for a ten-minute period at 1.5 liquid hourly space velocity. The products formed as a result thereof—gas, gasoline, gas oil and coke—are measured under stated conditions. The percentage of gasoline produced by this test is used as the indicator of activity of the catalyst. While the fresh catalyst added to the cracking system may have an activity of 35 to 45, as the catalyst is used, the activity decreases for various reasons and hence the activity falls to a level of about 25–30 in a continuously operating unit. This activity level has been accepted in the past because stable catalysts having higher activity were not available.

Recently certain aluminosilicates have been prepared which show a high degree of activity for cracking and other hydrocarbon conversion reactions and which are stable over long periods of time. These catalysts have been prepared and operated on a continuous basis in large units of commercial size to produce cracked products in increased volume. The new catalysts are highly active when compared with catalysts previously available or those used commercially for the cracking of gas oil to gasoline, such as the silica-alumina synthetic beads, or the various natural or treated clays used extensively in commercial cracking units. The new catalysts display activity at least 10–100 times as great as the prior commercial product, and are so active with respect to cracking that they cannot be measured suitably by the cracking activity test previously described. These catalysts also regenerate several times as fast as prior commercial silica-alumina catalyst. These catalysts are sensitive to cracking, demonstrate higher burning rates than prior catalysts and give inferior results unless the space velocity, catalyst contact time, temperature and pressure are closely controlled. A minimum contact time results in inadequate conversion viz. 1/50th that of ordinary catalyst, whereas excessive contact gives greatly excessive cracking of the reactants to gas and coke. Information relating to the catalysts is contained in U.S. Patent Nos. 2,882,243 and 2,882,244, application Serial No. 774,124, filed November 17, 1958, now abandoned, and Serial No. 99,960, filed March 31, 1961, as well as in other pending applications. The available methods of contacting catalyst and gases, such as used in the moving bed system or the fluid system, are not adequate for catalysts of this high activity. The catalyst can only be used in these systems when prepared in highly diluted form using low activity or inert material as a base. The ordinary silica-alumina hydrogel catalyst has been used as a base with a small percentage of high activity aluminosilicate added and the result in increased product and improved product is amazing. It is, of course, desired to use a substantially greater amount of the highly active aluminosilicate catalyst or use this catalyst in undiluted form, but first improved process and apparatus must be developed to permit this use without damage.

The object of this invention is to provide an improved apparatus and process for contacting highly active catalytic material with a reactant fluid for a critical short time period.

A further object of this invention is to provide an improved apparatus and process for converting hydrocarbons wherein a highly active catalyst can be brought into contact with a hydrocarbon fluid for a critical short time period.

A further object of this invention is to provide an improved cracking process and apparatus wherein a highly active catalyst can be brought into contact with a hydrocarbon fluid for a critical short time period.

A further object of this invention is to provide an improved regeneration process and apparatus wherein a highly active catalyst which has become contaminated with hydrocarbonaceous material can be brought into contact with an oxygen-containing gas for a critical short time period and regenerated for reuse.

These and other objects of the invention will be disclosed in further detail in the following discussion. The invention comprises in part gravitating highly active catalyst downwardly and laterally through an extended contacting zone as a bed of material disposed generally at about the angle of repose of the catalyst, with separated upflowing streams of gas picking catalyst from the confined margin of the bed of catalyst and immediately returning it to the surface of the sloping catalyst bed. The preferred size range of the highly active catalyst is about 60–150 mesh Tyler.

FIGURE 1 discloses in vertical section a gas-solids contacting vessel for practicising the invention.

FIGURE 2 discloses in vertical section a view of the contacting vessel of FIGURE 1 as seen on plane 2—2 of FIGURE 1.

FIGURE 3 shows an alternate embodiment of the invention using a vessel of circular cross-section.

FIGURE 4 shows in highly diagrammatic form an embodiment of the invention for maintaining a laterally flowing bed of contact material with an exposed bed surface.

Figure 2:
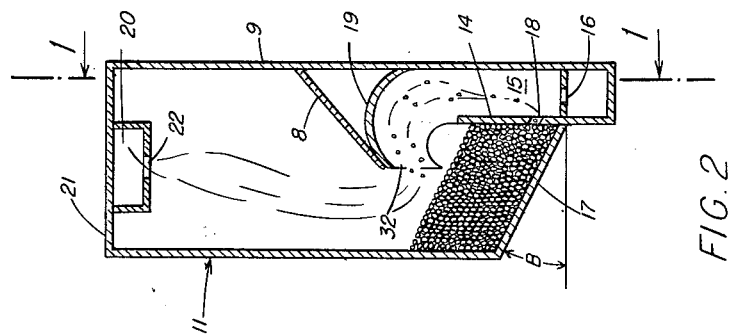
Figure 1:
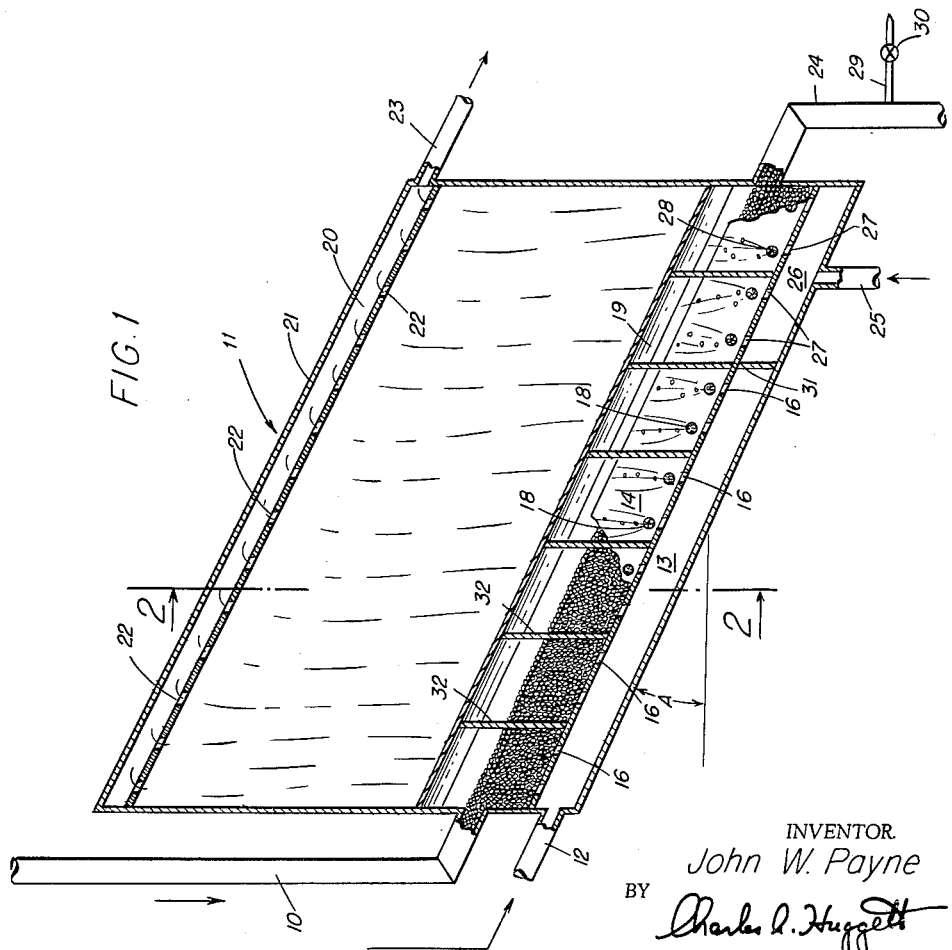

Referring now to FIGURE 1, a cross-section of a suitable reaction vessel is shown disposed generally at an angle A with the horizontal. A view of this same vessel is depicted on FIGURE 2, as seen on plane 2—2 of FIGURE 1. Similarly, FIGURE 1 is the view seen on plane 1—1 of FIGURE 2. The highly active catalyst is gravitated as a compact mass through the conduit 10 and pours onto the bed of catalyst in the vessel 11. The angle A is set at about the angle of repose of the catalyst. This angle is the angle made by a pile of the catalyst with a free surface or the angle made with the horizontal at which catalyst will just commence to roll across the surface. At an angle less than the angle of repose, the catalyst will not roll or flow laterally. The angle of repose for catalyst usable in this invention is generally about 26–35° with the horizontal and hence the vessel angle A is generally about 30–40° with the horizontal. A preferred angle is about 30–35 degrees with the horizontal. Generally angle B is about the same value as angle A, although there may be times when it is desirable to have angle B at a greater value than angle A, so as to increase the tendency of side flow toward the orifices.

The hydrocarbons prepared for treatment are introduced through the conduit 12 and duct 13. The inner wall 14 is generally vertical of shallow depth and yet adequate to retain the bed of catalyst particles laterally separate from the outer wall of the vessel 11. The inner wall 14 and outer wall 9 provide a vertical channel 15 and the hydrocarbons in duct 13 pass upwardly through the orifices 16 and channel 15. The particles move laterally under the influence of the sloping floor 17 disposed at the angle B with the horizontal and pass through orifices 18 into the rising stream of hydrocarbons. The flow of hydrocarbons through the channel 15 is maintained sufficient to lift the particles in the stream of rising gas as separate dispersed particles. A deflecting hood 19 is located at the upper end of the channel 15. This hood has a generally hemispherical cross-section and hence directs the particles through a hemispherical path from an upward direction to a downward direction. The particles, therefore, collect on the surface of the gravitating bed and the gas escapes around the hood 19 and upward in the vessel 11 to the duct 20 located under the roof 21 of the vessel 11. Orifices 22 are located in the duct 20 to collect the gas. The cracked product is passed from the vessel 11 through the conduit 23. The path P, during which the particles are in contact with the hydrocarbon vapors, is limited between the orifices 18 through the channel 15 back to the bed surface and this path is maintained between about 6 to 18 feet in general so that the contact time per pass is limited between about 1 to 2 seconds. The catalyst should make 1–10 passes while travelling through the vessel. The baffle 8 is located above the hemispherical deflecting hood 19 and is suitably located at an angle greater than the angle of repose of the catalyst so that catalyst will not accumulate on the deflecting hood. Should catalyst particles bound in the direction of the deflecting hood 19, they will be returned to the bed of catalyst in the vessel 11.

The particles travel laterally through the vessel 11 under the influence of the angle A and are discharged from the vessel 11 through the conduit 24. Before discharge from the vessel 11 the particles are contacted with steam or other inert gas to strip hydrocarbons from their surface and pores. The steam is introduced through the conduit 25, duct 26 and orifices 27. The particles are introduced into contact with the inert gas through the orifices 28. If considered desirable, steam or other inert gas can be introduced through the conduit 29 at a flow rate controlled by the valve 30. This steam travels back through the descending column of catalyst and escapes with the hydrocarbons through orifices 22, duct 20 and conduit 23. A barrier wall 31 prevents the mixing of steam and hydrocarbons in the ducts 13 and 26.

It is seen that the highly active catalyst particles are dropped into a rising stream of reactant hydrocarbons or other contacting fluid. The upward gas flow must be sufficient to continuously lift the particles and toss them back onto the bed surface. The gas flow and catalyst flow is adjusted so that the catalyst density in the rising gas stream is about 2 to 10 lbs./cu. ft. The particle size preferred is about 60–150 mesh Tyler. The temperature in the reaction zone will generally be about 800–1000° F. The reactant hydrocarbon vapors will be introduced at a temperature in the same general range. The catalyst particles can generally be somewhat hotter than the reactant hydrocarbons. In order to maintain vertical gas flow in the channel 15, the channel is generally supplied with vertical baffles 32 at spaced intervals. The catalyst to oil ratio for the highly reactive catalyst particles should be about 2 to 8 lbs. of catalyst per pound of oil. A sufficient length of reaction bed is provided in the reactor 11 to insure that the desired catalyst contact time is obtained.

The length of the reactor will depend upon the cracking rate or activity of the catalyst and the reaction temperature, as well as other factors to a lesser degree. The selected aluminosilicates in a size range of about 60–150 mesh are roughly 10–300 times more active at 900° F. than the ordinary silica-alumina cracking catalyst used commercially today. The reactivity of the catalyst is quite sensitive to temperature and hence at 1000° F. the most reactive catalyst will be found to be up to 800 times more reactive than the 35 A.I. beads. It is clear, therefore, that reaction temperature and activity of the catalyst will have a decided bearing upon the length of the reaction path, the catalyst path through the vessel, the number of gas-solid contacts, etc. This will require some modification of vessel arrangement depending upon the selected catalyst.

The spent catalyst is removed from the reaction zone and is transferred to a separate regeneration vessel similar in construction to vessel 11. An oxygen-containing gas is used in place of the hydrocarbon feed to burn contaminants from the catalyst particles, the particles gravitating laterally through the vessel, as described hereinabove, with respect to vessel 11. Since the catalyst particles regenerate faster than previously available catalyst, the time of contact can be reduced to broadly about 3 to 50 seconds and preferably about 5 to 25 seconds at 1200–1300° F. Excessive contact time of catalyst at the elevated temperature is unnecessary and slowly damages the catalyst so that it becomes unfit for reuse in the process. Steam or inert gas may be introduced into contact with the catalyst in the same manner as disclosed hereinabove with respect to vessel 11, thereby preventing oxygen-containing gas from traveling with the regenerated catalyst back into the reaction zone. Elevators or gas lifts can be used to move the catalyst either from the reactor to the regenerator or from the regenerator to the reactor. The temperature may be controlled in the regenerator at about 900–1400° F. and preferably 1100–1300° F. The pressure is generally at or near atmospheric pressure for economic reasons, although advanced pressure regeneration can be practiced under controlled conditions.

*Example 1*

As an example of the invention, a 20,000 bbl./day unit using a certain selected aluminosilicate catalyst which is highly active to catalytic cracking of hydrocarbons, such as petroleum gas oil, the desired hydrocarbon contact time was found to be 1.2 seconds. The required weight of catalyst in the reaction zone was found to be 1,250 lbs. With a catalyst loading in the reactor of 3 lbs. of catalyst per cu. ft. of hydrocarbon vapor, the volume of the reaction zone is 415 cu. ft. The residence time of the catalyst in the reaction zone is 4.5 seconds. The hydrocarbon vapor rate through this reaction zone is 348 cu. ft./second. With a vapor velocity up through the gas channel of 10 ft./sec. and a reaction path P of 12 ft. (length of channel and spillover zone), the hydrocarbon contact time is 12/10=1.2 seconds. The cross-section of the channel is 348/10=34.8 sq. ft. With a channel width of 1.5 ft. the channel length is 34.8/1.5=23.2 ft.

Considering the regeneration of the spent catalyst using the same catalyst as discussed hereinabove with respect to the cracking reaction, an air flow rate of 1640 cu. ft. measured at 1200° F. must be provided. The catalyst throughput of the regenerator is 1,112 lbs./sec. with a 3 to 1 recycle ratio of the catalyst. The average temperature of the regenerating catalyst particles is about 1250° F., the contact time for the catalyst with the gas being about 10 seconds. The amount of catalyst in the burning zone is about 11,120 lbs. With a regeneration path or length of burning path in the regenerator equal to (height of channel plus spillover) 15 feet and with a gas velocity in the channel of 10 ft./sec. the time of the air in the burning zone is 1.5 seconds. The volume of burning zone required to accommodate the air is 2,460 cu. ft. The cross-section of the fountain or channel is 164 sq. ft. The regenerator under these conditions has a channel thickness of 2 ft. and length of channel of 41 feet. In this regenerator, with a burning zone of 2,460 cu. ft., the catalyst loading in the channel for a residence time of 10 seconds would be 4.5 lbs. of catalyst per cu. ft. The catalyst would thus make about 6.7 average passes through the fountain duct while passing through the regenerator.

An alternate embodiment of the invention is shown on FIGURE 3. This represents a cross-section of the vessel similar to FIGURE 2 but shows the use of two fountains in the vessel, using an exterior wall 40 of circular cross-section. The wall 41 separates the two channels 42, 43. However, the gas after separation from the catalyst travels outwardly through a common outlet duct 20 in the roof of the vessel. The baffles 8 prevent the accidental accumulation of catalyst in the vessel 40. The side view of this embodiment is so similar to FIGURE 1 that specific representation is considered unnecessary. This embodiment permits the length of the vessel to be reduced radically and is particularly useful for that purpose.

FIGURE 4 shows in highly diagrammatic form a scheme for maintaining a fixed depth of bed of catalyst on the floor of the reaction vessel. Periodically, along the length of the vessel, vertical dams 44 are provided of the desired height to maintain a fixed depth of catalyst. The conditions are adjusted to provide a continuous flow of catalyst over each dam, insuring that the vessel 11 is filled with catalyst up to the level of the dams 44.

The example given hereinbefore is intended only to illustrate the invention and is not intended as a limitation of the scope of the invention. The only limitations intended are found in the attached claims.

I claim:

1. A method for contacting a fluid reactant material with a solid catalytic material which comprises, maintaining a confined downwardly sloping compact moving bed of solid catalytic particle material in a reaction zone, maintaining a plurality of separate and adjacent limited reaction paths along one margin of said moving bed, providing open passageways between said moving bed of solids and said limited reaction paths, passing reactant fluid upwardly through said limited reaction paths, passing catalytic particles through said passageways into suspended contact with said reactant fluid in said reaction paths and under conditions to obtain a desired reactant product, separating reactant product from suspended catalytic particles, returning separated catalytic particles to said bed of solid catalytic particles and recovering reactant product from the elongated reaction zone.

2. A system for contacting a fluid reactant material with finely divided catalytic material which comprises passing at least one continuous moving dense bed of catalytic particle material of desired thickness downwardly through a sloping reaction zone at an angle at least equal to the angle of repose of the catalyst particles, providing a plurality of separate upwardly extending limited length reaction zones adjacent the length of the moving bed of catalyst in the reaction zone, passing fluid reactant material upwardly through said limited reaction zones under desired reaction conditions, introducing catalyst material from said moving bed into the lower portion of each of said limited reaction zones for dilute phase flow upwardly therethrough with reactant material under desired temperature reaction conditions, separating reactant product material from catalytic material formed in said limited length reaction zones above said bed of particles under conditions to deflect catalyst particles onto the moving bed of particles, and recovering reactant product material from above the moving bed of catalytic material.

3. The system of claim 2 wherein more than one moving bed of catalytic material is provided in a reaction zone each of which is provided with its own adjacent limited length reaction zones.

4. The system of claim 2 wherein one moving dense bed of catalytic particle material is confined within one half of the cross section of a cylindrical reaction zone and is sloped downwardly to the vertical axis of the cylindrical reaction zone an amount sufficient to cause particle material to flow thereto.

5. The system of claim 2 wherein at least one limited length reaction zone is adjacent the vertical cross sectional axis of the sloping reaction zone and provided with open passageways into the lower portion thereof for introducing catalyst particles and reactant fluid.

6. A system for contacting finely divided particle material with gasiform material comprising in combination an elongated sloping reactor inclined at an angle equal to but not substantially greater than the angle of repose of a mass of particle material to be used therein but sufficiently inclined to facilitate horizontal movement therethrough of a continuous substantially uniformly thick bed of particle material, a plurality of substantially vertical limited and separate reaction sections placed along a longitudinal axis of said sloping reactor and separated from said continuous bed of particles by a common vertical baffle member provided with at least one open passageway through the lower portion to pass particle material from said continuous bed to the lower portion of each of said reaction sections, the upper end of said reaction sections being of a shape which will alter the direction of flow of particle material passing upwardly therethrough and discharge the particle material above but onto a continuous bed of particle material in the sloping reactor, means for introducing gasiform material to the lower portion of each of said limited reaction sections and means for removing gasiform material from the upper portion of said reactor.

7. The system of claim 6 wherein the plurality of limited reaction sections are placed along one longitudinal wall of the reactor and the bottom of the continuous bed of particle material is sloped to provide gravity feed of particle material to the lower portion of each of said limited reaction sections.

8. The system of claim 6 wherein the plurality of limited reaction sections are placed substantially vertically along the longitudinal axis of a sloping cylindrical reactor in between two sloping beds of particle material moving longitudinally through the reactor and sloped to feed particle material by gravity to said plurality of reaction sections for admixture with gasiform material introduced thereto.

9. The system of claim 6 wherein a common gasiform distributor manifold is provided beneath the plurality of limited reaction sections for introducing gasiform material thereto.

10. A method for contacting gasiform reactant material with catalytic particle material of exceedingly high activity which comprises maintaining a continuous moving bed of catalytic particle material passing through a reaction zone, maintaining a plurality of substantially vertical limited reaction sections adjacent to and in open communication in the lower portion with said moving bed of catalytic material, moving catalytic material from said bed of catalytic material into the lower portion of said limited reaction sections, combining gasiform reactant material with catalytic material in the lower portion of said limited reaction section, passing the combined material under desired dilute phase reaction conditions upwardly through said limited reaction sections to produce reaction products, separating dilute phase reaction products from catalytic material above said moving bed of catalytic material, returning separated catalytic material to the bed of catalytic material and recovering separated reaction products from said reaction zone.

References Cited by the Examiner

UNITED STATES PATENTS

| | | | |
|---|---|---|---|
| 2,327,489 | 8/43 | Becker | 208—155 |
| 2,498,405 | 2/50 | Fader | 23—288.3 |
| 2,502,953 | 4/50 | Jahnig | 208—155 |
| 2,606,097 | 8/52 | Goodson et al. | 208—153 |
| 2,723,949 | 11/55 | McCausland | 23—288.3 |

FOREIGN PATENTS

| | | |
|---|---|---|
| 801,917 | 9/58 | Great Britain. |
| 550,320 | 1/55 | Italy. |

ALPHONSO D. SULLIVAN, *Primary Examiner.*